United States Patent [19]

Lew

[11] Patent Number: 4,807,494
[45] Date of Patent: Feb. 28, 1989

[54] STEPWISE VARIABLE SPEED PLANETARY DRIVE

[76] Inventor: Hyok S. Lew, 7890 Oak St., Arvada, Colo. 80005

[21] Appl. No.: 5,111

[22] Filed: Jan. 20, 1987

Related U.S. Application Data

[63] Continuation-in-part of Ser. No. 891,124, Jul. 31, 1986, Pat. No. 4,733,579, which is a continuation-in-part of Ser. No. 750,787, Jul. 1, 1985, abandoned, which is a continuation-in-part of Ser. No. 747,889, Jun. 24, 1985, abandoned.

[51] Int. Cl.⁴ ............................................. F16H 57/10
[52] U.S. Cl. ...................................... 74/768; 74/785; 74/804
[58] Field of Search ................. 74/804, 803, 786, 785, 74/768

[56] References Cited

U.S. PATENT DOCUMENTS

| | | | |
|---|---|---|---|
| 2,170,444 | 8/1939 | Barbarou | 74/768 |
| 2,618,175 | 11/1952 | Bruce | 74/768 |
| 2,972,910 | 2/1961 | Menge, Sr. | 74/804 |
| 3,144,791 | 8/1964 | Menge, Sr. | 74/804 |
| 3,190,148 | 6/1965 | Flichy | 74/804 X |
| 3,307,434 | 3/1967 | Kope | 74/804 |
| 3,427,901 | 2/1969 | Wildhaber | 74/804 |
| 3,478,623 | 11/1969 | Noguchi | 74/804 X |
| 4,016,780 | 4/1977 | Baranyi | 74/804 |
| 4,524,644 | 6/1985 | Pierrat | 74/804 |
| 4,621,543 | 11/1986 | Gabilondo | 74/785 X |

FOREIGN PATENT DOCUMENTS

| | | | |
|---|---|---|---|
| 727755 | 6/1932 | France | 74/804 |
| 928979 | 12/1947 | France | 74/804 |
| 588423 | 5/1947 | United Kingdom | 74/804 |
| 612579 | 11/1948 | United Kingdom | 74/804 |
| 994432 | 6/1965 | United Kingdom | 74/804 |

*Primary Examiner*—Rodney H. Bonck
*Assistant Examiner*—Dwight G. Diehl

[57] ABSTRACT

The variable speed planetary drive of the present invention comprises a combination of a plurality of external gears of varying pitch diameters and a first power transfer gear coaxially affixed to each other and rotatably mounted on an eccentric section of a first shaft; a second power transfer gear coaxially affixed to a second shaft disposed in line with the first shaft wherein the first and second power transfer gears engage each other; and a combination of internal ring gears of varying pitch diameters coaxially affixed to each other and disposed coaxially to the first and second shaft in an axially shiftable arrangement wherein each shift engages only one of the external gears to only one of the internal ring gears. The combination of the internal ring gears includes means for restraining the internal ring gears from rotating, which means may be a permanent type or a type that can be activated and deactivated.

16 Claims, 2 Drawing Sheets

STEPWISE VARIABLE SPEED PLANETARY DRIVE

BACKGROUND OF THE INVENTION

This patent application is a continuation-in-part application to patent application Ser. No. 891,124 entitled "Orbiting Ring Gear Planetary Drive" filed on July 31, 1986 now U.S. Pat. No. 4,733,589, which is a CIP of abandoned application Ser. No. 750,787 filed July 1, 1985 which is a CIP of abandoned application 747,889 filed June 24, 1985.

In recent years, many different new versions of the planetary drive have been developed and put in market. The conventional planetary drives comprise a centrally disposed sun gear simultaneously engaging at least two planetary gears disposed in an axisymmetric arrangement about the sun gear. Each planetary gear includes two sets of gear teeth of different pitch diameters wherein the first set of the gear teeth is engaged by a power output ring gear, while the second set of the gear teeth is engaged by a stationary ring gear. In the new versions of the planetary drive, a single planetary gear including two sets of gear teeth of different pitch diameters is rotatably mounted on an eccentric shaft rigidly connected to a power input shaft in a parallel and slightly eccentric relationship. As a consequence, the pitch diameters of the two sets of the gear teeth included in the planetary gear are only slightly smaller than the power output ring gear and the stationary ring gear respectively engaged by the two sets of gear teeth included in the single planetary gear. In these new versions of the planetary drive, the conventional gear teeth are frequently replaced with sprocket-like teeth engaging a plurality of rollers or with a modified gear teeth design of various types. These new types of the planetary drive have succeeded in reducing the bulk and weight of planetary drives and, consequently, brought forth many advantages and conveniences to the users of the gear reducers.

It is well known that in many industries using gear reducers, there are demands and requirements to vary the speed of the machines or equipments driven by the gear reducers. The conventional stepwise variable speed gear transmissions employ many gears, shafts and bearings and, consequently, they are bulky, heavy and expensive. None of the conventional or new versions of the planetary drives existing at the present time provides the capability to vary the transmission ratio as all of those planetary drives are for power transmissions at a fixed ratio. The present invention teaches an amazingly simple and practical design of a stepwise variable speed planetary drive.

BRIEF SUMMARY OF THE INVENTION

The primary object of the present invention is to provide a stepwise variable speed planetary drive that transfers power from a first shaft to a second shaft at a number of different transmission ratios and, yet, employs only two rotating members including gear teeth or modified versions of the gear teeth.

Another object is to provide the stepwise variable speed planetary drive employing a small amount of eccentricity in the installation of the single planetary gear orbiting about the common axis of the power input and output shafts.

A further object is to provide the stepwise variable speed planetary drive including a built-in clutch that enables one to shift from one speed to another speed without mechanically disconnecting the input shaft of the stepwise variable speed planetary drive from the motor or engine.

Yet another object is to provide the stepwise variable speed planetary drive wherein the combination of the stationary internal ring gears is held in a stationary position by a braking means, which braking means plays the role of the built-in clutch.

Yet a further object is to provide the stepwise variable speed planetary drive including a neutral shift position wherein one set of the gear teeth included in the single planetary gear does not engage any stationary internal ring gears.

Still another object is to provide the stepwise variable speed planetary drive employing external gears of a sprocket-like construction lapped with a closed loop of roller chain and internal ring gears of a sprocket-like construction.

Still a further object is to provide a fixed speed planetary drive of a most compact and structurally sound design.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
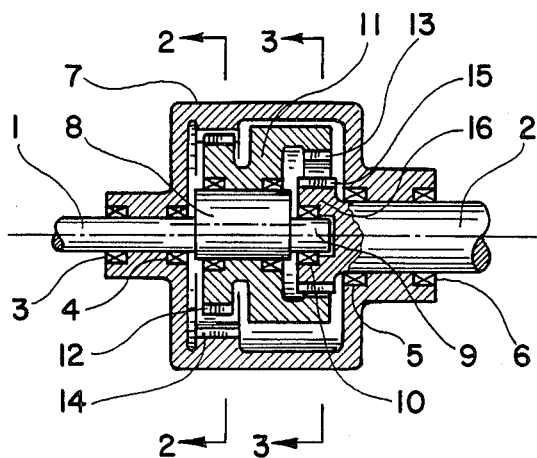
FIG. 1 illustrates a cross section of a fixed ratio planetary drive having the most compact and structurally sound design as taught by the present invention.

In FIG. 1 there is illustrated a cross section of a fixed ratio planetary drive having a most compact and structurally sound design as taught by the principles of the present invention. A first and second shafts 1 and 2 disposed in line to one another are rotatably secured by a plurality of bearings 3, 4, 5 and 6 affixed to the housing 7. One extremity of the first shaft 1 adjacent to the second shaft 2 includes an eccentric shaft 8 affixed thereto in a parallel and slightly eccentric arrangement. The concentric extremity 9 of the first shaft 1 is rotatably supported by a bearing 10 secured to one extremity of the second shaft 2. A planetary rotary member 11 includes a set of external gear teeth or an external generally circular cylindrical traction surface with meshing means 12 and a set of internal ring gear teeth or internal generally circular cylindrical traction surface with meshing means 13, wherein the two sets of gear teeth or the generally circular traction surfaces with meshing menas 12 and 13 have different pitch diameters. The planetary rotary member 11 is rotatably mounted on the eccentric shaft 8. The set of the external gear teeth or external generally circular cylindrical traction surface with meshing means 12 concentric to the eccentric shaft 8 engages a stationary internal ring gear or stationary internal generally circular cylindrical traction surface with meshing means 14 concentric to the first shaft 1 and affixed to the housing 7. The set of internal ring gear teeth or internal generally circular cylindrical traction surface with meshing means 13 concentric to the eccentric shaft 8 engages a set of external gear teeth or external generally circular cylindrical traction surface 15 concentric to the second shaft 2 that is included in a power transfer rotary member 16 nonrotatably and coaxially affixed to the second shaft 2.

It can be easily shown that the ratio of the rotational speed $\omega$ of the shaft 1 over that of shaft 2 is given by equation $$\frac{\omega_2}{\omega_1} = \frac{e(R_2 - R_1)}{R_1 R_2} / \left( \frac{e}{R_2} + 1 \right),$$

where e is the distance from the central axis of the shaft 1 to the central axis of the eccentric shaft 8, $R_1$ and $R_2$ are respectively the pitch diameters of the set of the external gear teeth or external generally circular cylindrical traction surface with meshing means 12 and that of the set of the internal gear teeth or internal generally circular cylindrical traction surface with meshing means 13. It is clear from the aforementioned equation that the reduction ratio of the planetary drive can be varied widely by employing an appropriate combination of the pitch diameters and eccentric distance. It is also noticed that the direction of rotation of the two shafts 1 and 2 can be made the same or opposite by employing $R_2$ greater or less than $R_1$. It should be mentioned that the generally circular cylindrical traction surfaces 12, 13, 14 and 15 may be with or without meshing means. The generally circular cylindrical traction surfaces with meshing means represent gear teeth, modified gear teeth, sprocket teeth and rollers and other types of teeth to teeth or teeth to roller meshing engagements, while the generally circular cylindrical traction surfaces without meshing means represent surfaces under a pressurized frictional contact with one another wherein the motion is transmitted by friction. Even though the planetary drive relying on frictional contact is not specifically illustrated as in the case of the gear teeth, the present invention also includes and claims the planetary drives such as those illustrated or described which use meshing engagement between driving or driven rotary members or frictional engagement therebetween or mixed combinations of the two types of engagements. It should also be mentioned that the central axis of the combination of the eccentric shaft 8 and the rotary member 11 are eccentric about the central axis of the first shaft 1 and, consequently, it must be balanced in mass distribution about the central axis of the shaft 1. The specific example of such a mass balancing, that is considered a matter of design, is not shown in the embodiment illustrated in FIG. 1 for the sake of brevity in the illustration, while it is included in the embodiments shown in FIGS. 4 and 7.

Figure 2:
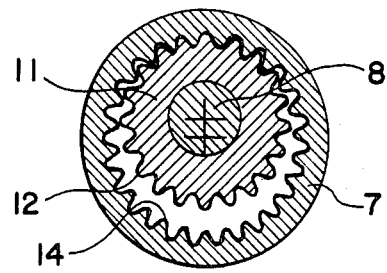
FIG. 2 illustrates another cross section of the apparatus shown in FIG. 1 taken along plane 2—2 as shown in FIG. 1.

In FIG. 2 there is illustrated another cross section of the apparatus shown in FIG. 1, which cross section is taken along plane 2—2 as shown in FIG. 1. The rotary member 11 rotatably mounted on the eccentric shaft 8 as well as the set of the external gear teeth or the external generally circular cylindrical traction surface with meshing means 12 engaging the set of stationary internal gear teeth or the stationary internal generally circular cylindrical traction surface with meshing means 14 affixed to the housing 7, is clearly illustrated in this cross sectional view. It is readily realized that in place of the two sets of gear teeth 12 and 14 as shown in the illustrated embodiment, two sets of tapered or straight circular cylindrical frictional surfaces respectively included in the rotary member 11 and the housing 7 can be employed.

Figure 3:
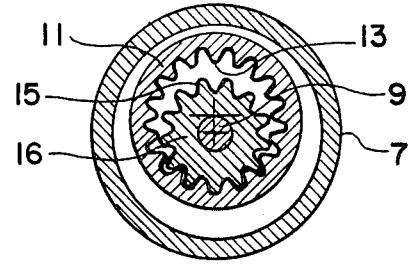
FIG. 3 illustrates a further cross section of the apparatus shown in FIG. 1 taken along plane 3—3 as shown in FIG. 1.

In FIG. 3 there is illustrated a further cross section of the apparatus shown in FIG. 1, which cross section is taken along plane 3—3 as shown in FIG. 2. In this cross sectional view, the set of the internal ring gear teeth or the internal generally circular cylindrical traction surface 13 included in the planetary rotary member 11, that engages the set of the external gear teeth or external generally circular cylindrical traction surface 15 included in the rotary member 16, is explicitly illustrated. For the sake of the brevity in the description, the wording "generally circular cylindrical traction surface" will be used hereafter to imply the set of gear teeth or other meshing means as well as the frictional surfaces employed in the transmission of the rotating motions from one rotary member to the other rotary member.

Figure 4:
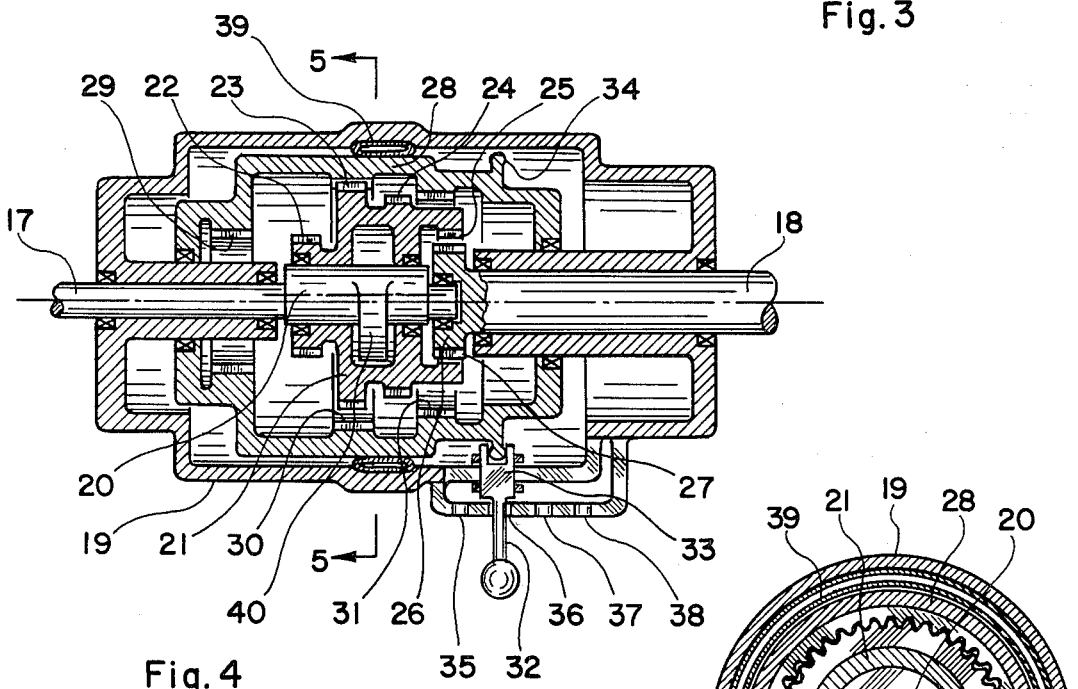
FIG. 4 illustrates a cross section of an embodiment of the stepwise variable speed planetary drive constructed in accordance with the principles of the present invention.

In FIG. 4 there is illustrated a cross section of an embodiment of the stepwise variable speed planetary drive constructed in accordance with the principles of the present invention, which cross section is taken along a plane including the common central axis of the first and second shafts 17 and 18 rotatably disposed in line as supported by a plurality of bearings secured to the housing 19. One extremity of the first shaft 17 includes an eccentric shaft 20 rigidly affixed to the first shaft 17 in a parallel and slightly offset arrangement. The eccentric shaft 20 rotatably supports a planetary rotary member 21 including a plurality of external generally circular cylindrical traction surfaces 22, 23 and 24 and a power transfer internal generally circular cylindrical traction surface 25, which are coaxially disposed about the central axis of the eccentric shaft 20. The second shaft 18 includes a rotary member 26 coaxially and rigidly affixed to one extremity thereof, which rotary member 26 includes an external generally circular cylindrical traction surface 27 coaxial to the second shaft 18 that engages the power transfer internal generally circular cylindrical traction surface 25. The planetary rotary member 21 is disposed within a hollow cylindrical member 28 rotatably disposed within the housing 19 in a coaxial arrangement about the common central axis of the first and second shafts 17 and 18. The hollow cylindrical member 28 includes a plurality of internal generally circular cylindrical traction surfaces 29, 30 and 31. The hollow cylindrical member 28 that is rotatable about the central axis of the first and second shafts 17 and 18 is also shiftable in a direction parallel to the central axis of the first and second shafts 17 and 18. The shifting stick 32 with one extremity 33 rotatably engaged by the flange 34 coaxially affixed to the hollow cylindrical member 28, shifts and retains the hollow cylindrical member to and at various positions 35, 36, 37 and 38. The braking means 39 such as the particular embodiment actuated by an inflatable tubing prevents the hollow cylindrical member 28 from rotating when the brake is activated, while the hollow cylindrical member is allowed to rotate freely when the brake is deactivated. The mass balancing means 40 such as the counter weight employed in the particular embodiment is to balance the mass distribution in the combination of the planetary rotary member 21 and the eccentric shaft 20 about the central axis of the first shaft 17. Only one of the external gears or external generally circular cylindrical traction surfaces 22, 23 and 24 included in the planetary rotary member 21 and only one of the internal ring gears or internal generally circular cylindrical traction surfaces 29, 30 and 31 included in the hollow cylindrical member 28 engage one another at each of the shift positions 35, 36 and 38. At the shift position 37, the planetary rotary member 21 and the hollow cylindrical member 28 remain disengaged. Each pair of gears or generally circular cylindrical traction surfaces engaging one another at each of the shift positions has different pitch diameter and, consequently, each of the shift positions 35, 36 and 38 provides a different transmission ratio. When the pitch diameter of the pair of gears engaged at a particular shift position is smaller than the pitch diameter of the power transfer gear, the first and second shafts 17 and 18 rotate in the two opposite directions, while if the former is greater than the latter, the two shafts rotate in the same direction at the transmission ratio given by the equation presented in conjunction with FIG. 1. Now, it is shown that the present invention teaches how to construct a stepwise variable speed mechanical transmission that includes only two rotating components. By adding more pairs of gears or generally circular cylindrical traction surfaces to the combination shown in FIG. 4, one can construct a stepwise variable speed mechanical transmission of three or more transmission ratios that provides forward as well as reverse transmissions. When the braking means 39 is deactivated, the hollow cylindrical member 28 is allowed to rotate with the planetary rotary member 21, which allows easy shifting from one transmission ratio to the other. When the braking means is partially activated, only a portion of the rotating motion of the first shaft 17 is transmitted to the second shaft 18 as the remaining portion of the rotating motion is transmitted to the hollow cylindrical member 28 rotating under a partial braking. As a consequence, the stepwise variable speed planetary drive of the present invention functions as a continuously variable speed mechanical transmission under a partial braking, wherein the net transmission ratio is determined by the degree of braking or unbraking. When the braking means 39 is fully activated, one hundred percent of the rotating motion of the first shaft 17 is transmitted to the second shaft 18 without any slip at the transmission ratio intrinsic to the particular pair of gears under engagement. The neutral shift position 37 enables one to disengage the second shaft 18 from the first shaft 17 for any extended period of time without relying on the braking means 39. It is clear that the braking means 39 as well as the neutral shift position 37 plays the role of a built-in clutch.

Figure 5:
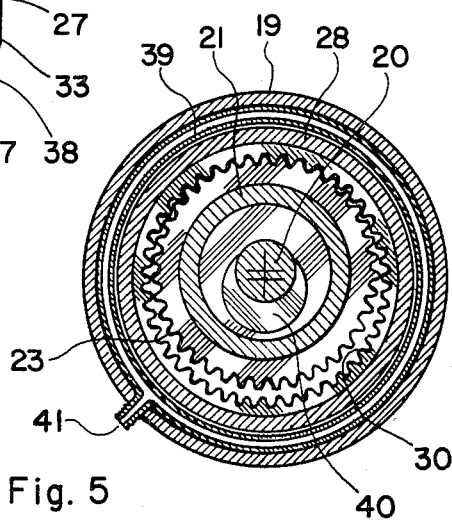
FIG. 5 illustrates another cross section of the apparatus shown in FIG. 4 taken along plane 5—5 as shown in FIG. 4.

In FIG. 5 there is illustrated another cross section of the apparatus shown FIG. 4, which cross section is taken along plane 5—5 as shown in FIG. 4. The braking means 39 is activated or deactivated by inflating or deflating the brake tubing or bellow wherein the compressed air is supplied or vented through the port 41 connected to the brake tubing. Of course, other mechanical types of brake such as a belt brake, drum brake, disc brake etc. may be employed as braking means 39 in place of the pneumatic or hydraulic tubular brake imployed in the particular embodiment shown in FIGS. 4 and 5.

Figure 6:
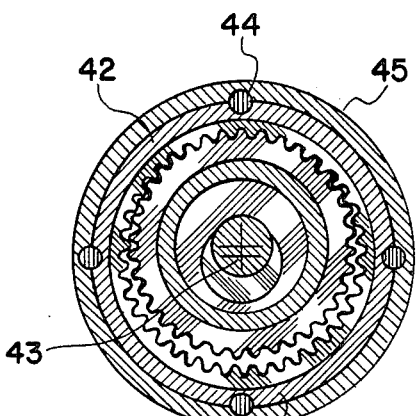
FIG. 6 illustrates a cross section of another embodiment of the stepwise variable speed planetary drive equivalent to the cross section shown in FIG. 5.

In FIG. 6 there is illustrated a cross section of another embodiment of the stepwise variable speed planetary gear drive having essentially the same construction as the embodiment shown in FIGS. 4 and 5 with one exception being the braking means, which cross section is equivalent to that shown in FIG. 5. In this embodiment essentially the same as that shown in FIGS. 4 and 5 without the braking means 39, the hollow cylindrical member 42 is shiftably and nonrotatably disposed coaxially about the central axis 43 of the first and second shafts. One or more of the guide keys 44 disposed in the axial direction slidably engages matching grooves respectively disposed in the inside cylindrical surface of the housing 45 and the outside cylindrical surface of the hollow cylindrical member 46, whereby the hollow cylindrical member 46 is shiftable to the various shift positions as shown in FIG. 4, while it is not rotatable relative to the housing 45. In general, the drive motor or engine has to be stopped in order to shift the transmission ratio in this embodiment of the stepwise variable speed planetary drive.

Figure 7:
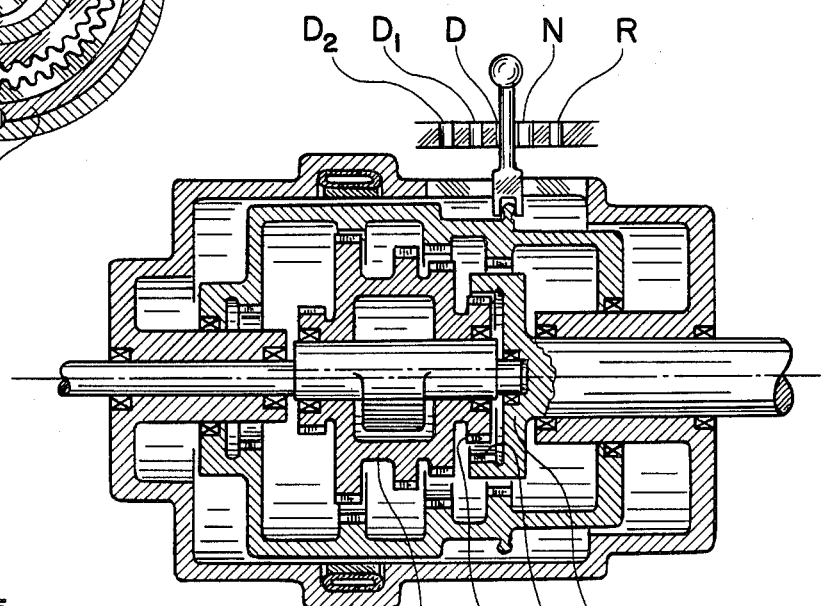
FIG. 7 illustrates a cross section of a further embodiment of the stepwise variable speed planetary drive of the present invention.

In FIG. 7 there is illustrated a cross section of a further embodiment of the stepwise variable speed planetary drive of the present invention, which includes essentially the same elements assembled in the same arrangement as the apparatus illustrated in FIGS. 4 and 5 with one exception, which exception is the employment of the external power transfer gear or external power transfer generally circular cylindrical traction surface 47 included in the rotary member 48 and the internal ring gear or internal generally circular cylindrical traction surface 49 included in the power transfer rotary member 50. The various combination of the gears or generally circular cylindrical traction surfaces are arranged in such a way that the various shift positions are in the same order as that of the standard gear shift positions in the automobile wherein the shift positions include "reverse", "neutral", "drive", "drive 1" and "drive 2" in that order. As mentioned in conjunction with FIG. 4, more transmission ratios can be added to the stepwise variable speed planetary drive of the present invention without increasing the number of functional rotating parts beyond two, which are the planetary rotary member 48 and the power transfer rotary member 50. It should be understood that the first shaft or power input shaft of the stepwise variable speed planetary drive may be coupled to the motor or engine output shaft directly or by another gear transmission, while the second shaft or power output shaft of the stepwise variable speed planetary drive may be coupled to the power take-off shaft or driving shaft directly or by a further gear transmission. The most powerful advantage provided by the principles of the present invention is the teaching that shows how to construct a stepwise variable speed planetary drive with multiple transmission ratios that comprises only two rotating elements.

Figure 8:
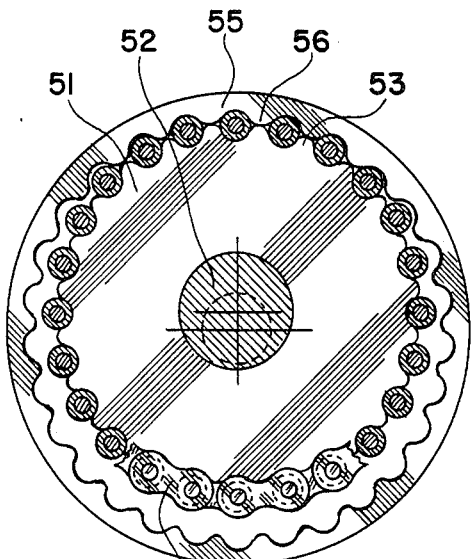
FIG. 8 illustrates an embodiment of a modified gear teeth design usable in conjunction with the present invention.

In FIG. 8 there is illustrated another embodiment of the generally circular cylindrical traction surfaces with meshing means that can be employed to accomplish the same end results as the arrangement shown in FIG. 2 or 3. The rotary member 51 rotatably mounted on the eccentric shaft 52 includes an external generally circular cylindrical traction surface comprising a set of sprocket teeth 53 and a closed loop of roller chain 54 lapped therearound. The hollow cylindrical member 55 includes a set of internal sprocket teeth 56 that is engaged by the roller chain 54. It is quite clear that, in place of the combination of the sprocket teeth and the roller chain, the combination of timing belt teeth and a two-sided timing belt arranged in the same way as that illustrated in FIG. 8 can be employed in the construction of the stepwise variable speed planetary drive of the present invention such as those embodiments shown in FIGS. 1, 4 and 7.

Figure 9:
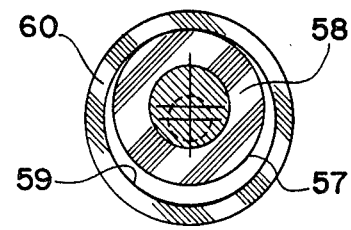
FIG. 9 illustrates an embodiment of a friction drive arrangement usable in conjunction with the present invention.

In FIG. 9 there is illustrated an embodiment of the generally circular cylindrical traction surface without meshing means that can be employed to accomplish the same object as that of the arrangement shown in FIG. 2 or 3. The generally circular cylindrical traction surface 57 included in the rotary member 58 is a simple external generally circular cylindrical surface having a high friction coefficient, that is under a pressurized contact with the internal circular cylindrical surface 59 with a high friction coefficient included in the hollow cylindrical member 60. These generally circular cylindrical surfaces 58 and 59 under a pressurized contact to one another may be straight or tapered generally circular cylindrical surface, which surfaces may also include one or more of tapered circumferential grooves and ridges engaging each other like a V-belt engaging V-grooves included in the V-belt pulley.

Figure 10:
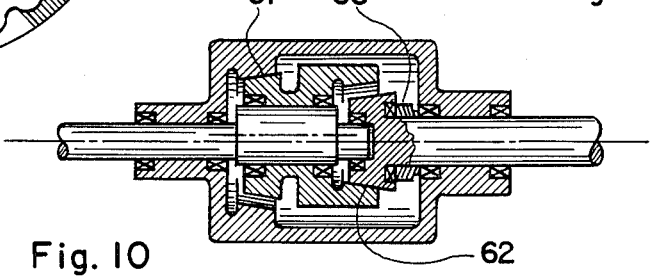
FIG. 10 illustrates a fixed ratio planetary drive similar to the apparatus shown in FIG. 1 that now employs a frictional drive arrangement.

In FIG. 10 there is illustrated a fixed ratio planetary drive having essentially the same construction as the apparatus shown in FIG. 1 with one exception being that the generally circular cylindrical traction surfaces employed therein comprise the friction surfaces such as those shown in FIG. 9 in place of the meshing engagement of generally circular cylindrical surfaces such as those shown in FIG. 2 or 3. The two sets of friction surfaces 61 and 62 transmitting torques are tapered in such a way that a single spring bias means 63 such as a stack of conical washer springs provide pressurized contact for both sets of the frictional surfaces transmitting torques. It is self evident that a stepwise variable speed planetary drive such as those shown in FIGS. 4 and 7 can be constructed by using straight and/or tapered frictionally torque transferring surfaces such as those shown in FIG. 9 in place of the meshing engagements such as those shown in FIGS. 2, 3 and 8.

While the principles of the present invention have now been made clear by the illustrative embodiments, it will be immediately obvious to those skilled in the art many modifications of the structures, arrangements, proportions, elements and materials which are particularly adapted to the specific working environments and operating conditions in the practice of the invention without departing from those principles.

I claim:

1. A stepwise variable speed mechanical transmission apparatus comprising in combination:
    (a) a housing;
    (b) a first shaft rotatably mount in the housing;
    (c) a second shaft disposed in line with the first shaft and rotatably mount in the housing, said second shaft including a first rotary member nonrotatably and coaxially affixed to the second shaft;
    (d) a second roary member disposed in a parallel and eccentric arrangement with respect to the central axis of the first shaft and secured to the first shaft wherein the second rotary member is rotatable about the central axis thereof, said central axis of the second rotary member orbiting about the central axis of the first shaft at the same angular velocity as the angular velocity of the first shaft;
    (e) a hollow cylindrical member disposed within the housing and enclosing the second rotary member said hollow cylindrical member being axially shiftable in a direction parallel to the central axis of the first shaft, the hollow cylindrical member including a plurality of internal generally circular cylindrical traction surfaces of various pitch diameters arranged in series in a coaxial arrangement with respect to the central axis of the first shaft and further including means for nonrotatably securing the hollow cylindrical member to the housing;
    (f) an internal generally circular cylindrical traction surface included in said second rotary member in a coaxial arrangement with respect to the central axis of the second rotary member, said internal generally circular cylindrical traction surface engaging an external generally circular cylindrical traction surface included in the first rotary member in a coaxial arrangement with respect to the central axis of the second shaft and disposed within said internal generally circular cylindrical traction surface;
    (g) a plurality of external generally circular cylindrical traction surfaces of various pitch diameters included in the second rotary member in series in a coaxial arrangement with respect to the central axis of the second rotary member, wherein only one of said plurality of external generally circular cylindrical traction surfaces engages only one of said plurality of internal generally circular cylindrical traction surfaces included in the hollow cylindrical member at each of various shift positions; and
    (h) means for shifting and retaining the hollow cylindrical member to and at each of the various shift positions wherein only one of said plurality of external generally circular cylindrical traction surfaces engages only one of said plurality of internal generally circular cylindrical traction surfaces at each of the various shift positions.

2. The combination as set forth in claim 1 wherein said combination includes an additional shift position wherein none of said plurality of external generally circular cylindrical traction surfaces engages any of said plurality of internal generally circular cylindrical traction surfaces.

3. The combination as set forth in claim 2 wherein said means for nonrotatably securing the hollow cylindrical member to the housing comprises a braking means that can be activated and deactivated.

4. The combination as set forth in claim 1 wherein said means for nonrotatably securing the hollow cylindrical member to the housing comprises a braking means that can be activated and deactivated.

5. The combination as set forth in claim 1 wherein said means for nonrotatably securing the hollow cylindrical member to the housing comprises a slidable and nonrotatable mechanical coupling between the hollow cylindrical member and the housing.

6. The combination as set forth in claim 1 wherein said external and internal generally circular cylindrical traction surfaces include gear teeth for nonslipping engagements between said external and internal generally circular cylindrical traction surfaces.

7. The combination as set forth in claim 1 wherein said external generally circular cylindrical traction surfaces include sprocket teeth and closed loop of roller chains lapped therearound, and said internal generally circular cylindrical traction surfaces include sprocket teeth for nonslipping engagement between said external and internal generally circular cylindrical traction surfaces.

8. The combination as set forth in claim 1 wherein said external and internal generally circular cylindrical traction surfaces include friction surfaces of high friction coefficient for frictional engagements between said external and said internal generally circular cylindrical traction surfaces.

9. A stepwise variable speed mechanical transmission comprising in combination:
(a) a housing;
(b) a first shaft rotatably mounted in the housing;
(c) a second shaft disposed in line with the first shaft and rotatably mounted in the housing, said second shaft includng a first rotary member nonrotatably and coaxially affixed to the second shaft;
(d) a second rotary member disposed in a parallel and eccentric arrangement with respect to the central axis of the first shaft and secured to the first shaft wherein the second rotary member is rotatable about the central axis thereof, said central axis of the second rotary member orbiting about the central axis of the first shaft at the same angular velocity as the angular velocity of the first shaft;
(e) a hollow cylindrical member disposed within the housing and enclosing the second rotary member said hollow cylindrical member being axially shiftable in a direction parallel to the central axis of the first shaft, the hollow cylindrical member including a plurality of internal generally circular cylindrical traction surfaces of various pitch diameters arranged in series in a coaxial arrangement with respect to the central axis of the first shaft and further including means for nonrotatably securing the hollow cylindrical member to the housing;
(f) an externally generally circular cylindrical traction surface included in said second rotary member in a coaxial arrangement with respect to the central axis of the second rotary member, said external generally circular cylindrical traction surface engaging an internal generally circular cylindrical traction surface included in the first rotary member in a coaxial arrangement with respect to the central axis of said second shaft;
(g) a plurality of external generally circular cylindrical traction surfaces of various pitch diameters included in the second rotary member in series in a coaxial arrangement with respect to the central axis of the second rotary member, wherein only one of said plurality of external generally circular cylindrical traction surfaces engages only one of said plurality of internal generally circular cylindrical traction surfaces included in the hollow cylindrical member at each of various shift positions; and
(h) means for shifting and retaining the hollow cylindrical member to and at each of the various shift positions wherein only one of said plurality of external generally circular cylindrical traction surfaces engages only one of said plurality of internal generally circular cylindrical traction surfaces at each of the various shift positions.

10. The combination as set forth in claim 9 wherein said combination includes an additional shift position wherein none of said plurality of external generally circular cylindrical traction surfaces engages any of said plurality of internal generally circular cylindrical traction surfaces.

11. The combination as set forth in claim 10 wherein said means for nonrotatably securing the hollow cylindrical member to the housing comprises a braking means that can be activated and deactivated.

12. The combination as set forth in claim 9 wherein said means for nonrotatably securing the hollow cylindrical member to the housing comprises a braking means that can be activated and deactivated.

13. The combination as set forth in claim 9 wherein said means for nonrotatably securing the hollow cylindrical member to the housing comprises a slidable and nonrotatable mechanical coupling between the hollow cylindrical member and the housing.

14. The combination as set forth in claim 9 wherein said external and internal generally circular cylindrical traction surfaces include gear teeth for nonslipping engagements between said external and internal generally circular cylindrical traction surfaces.

15. The combination as set forth in claim 9 wherein said external generally circular cylindrical traction surfaces include sprocket teeth and closed loop of roller chains lapped therearound, and said internal generally circular cylindrical traction surfaces include sprocket teeth for nonslipping engagement between said external and internal generally circular cylindrical traction surfaces.

16. The combination as set forth in claim 9 wherein said external and internal generally circular cylindrical traction surfaces include friction surfaces of high friction coefficient for frictional engagements between said external and said internal generally circular cylindrical traction surfaces.

* * * * *